(12) United States Patent
Suh et al.

(10) Patent No.: US 6,809,060 B2
(45) Date of Patent: Oct. 26, 2004

(54) AEROGEL TYPE PLATINUM-TUTHENIUM-CARBON CATALYST, METHOD FOR MANUFACTURING THE SAME AND DIRECT METHANOL FUEL CELL COMPRISING THE SAME

(75) Inventors: Dong Jin Suh, Seoul (KR); Tae-Jin Park, Seoul (KR); Young-Hyun Yoon, Kyunggi-do (KR); Kang Hee Lee, Kyunggi-do (KR); Il Gon Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 10/299,679

(22) Filed: Nov. 20, 2002

(65) Prior Publication Data

US 2003/0176277 A1 Sep. 18, 2003

(30) Foreign Application Priority Data

Mar. 13, 2002 (KR) ........................................ 2002-13545

(51) Int. Cl.[7] ........................... B01J 21/18; B01J 23/40; B01F 17/00; H01M 4/86
(52) U.S. Cl. ........................... 502/185; 516/38; 429/40; 429/42; 429/43
(58) Field of Search ........................... 502/185; 516/38; 429/40, 42, 43

(56) References Cited

U.S. PATENT DOCUMENTS

| 4,717,708 A | * | 1/1988 | Cheng et al. | ............... 502/233 |
| 4,997,804 A | | 3/1991 | Pekala | |
| 5,407,757 A | * | 4/1995 | Struthers | ..................... 429/26 |

(List continued on next page.)

FOREIGN PATENT DOCUMENTS

KR 2000-0058668 10/2000

OTHER PUBLICATIONS

Frelink et al., "The Effect of Sn on Pt/C Catalysts for the Methanol Electro–Oxidation", *Electrochimica Acta*, vol. 39, No. 11/12, pp. 1871–1875, Jan. 1994.

Gasteiger et al., "Methanol Electrooxidation on Well–Characterized Pt–Ru Alloys", *J. Phys. Chem.*, vol. 97, pp. 12020–12029, Sep. 1993.

(List continued on next page.)

*Primary Examiner*—Mark L. Bell
*Assistant Examiner*—Patricia L. Hailey
(74) *Attorney, Agent, or Firm*—Browdy and Neimark, P.L.L.C.

(57) ABSTRACT

An aerogel type platinum-ruthenium-carbon catalyst of microporous structure maintaining long-term high catalytic activity, suitable for a direct methanol fuel cell, is manufactured by a sol-gel process, and supercritical drying while maintaining a microporous structure. The catalyst contains 5 to 70% by weight of platinum and ruthenium, remainder carbon, the platinum and ruthenium atomic ratio being of 1/4 to 4/1. Metal salts and base catalyst are added to a solution of organic gel materials, a solution of basic amine is added to the first solution, and the pH of the resulting solution is adjusted forming a sol, the sol is aged at 40 to 90 for 1 to 20 days forming and stabilizing the gel, solvent is removed from the gel by supercritical drying, and finally the aerogel is carbonized in an inert atmosphere, followed by hydrogen reduction.

14 Claims, 1 Drawing Sheet

U.S. PATENT DOCUMENTS

| | | | | | |
|---|---|---|---|---|---|
| 5,429,886 | A | * | 7/1995 | Struthers | 429/44 |
| 5,601,938 | A | * | 2/1997 | Mayer et al. | 429/40 |
| 6,232,264 | B1 | | 5/2001 | Lukehart et al. | |
| 6,303,046 | B1 | * | 10/2001 | Risen et al. | 252/1 |
| 2003/0073575 | A1 | * | 4/2003 | Gorer | 502/339 |
| 2003/0224114 | A1 | * | 12/2003 | Yang | 427/376.1 |

OTHER PUBLICATIONS

Radmilovic et al., "Structure and Chemical Composition of a Supported Pt–Ru Electrocatalyst for Methanol Oxidation", *Journal of Catalysis*, vol. 154, pp. 98–106, Feb. 1995.

Watanabe et al., "Preparation of Highly Dispersed Pt + Ru Alloy Clusters and the Activity for the Electrooxidation of Methanol", *J. Electroanal. Chem.*, vol. 229, pp. 395–406, Jan. 1987.

Pekala et al., "Organic Aerogels from the Polycondensation of Resorcinol with Formaldehyde", Journal of Materials Science, vol. 24, pp. 3221–3227 (1989), no month.

Maldonado–Hodar et al., "Metal–Carbon Aerogels as Catalysts and Catalyst Supports", *Studies on Surface Science and Catalysts*, vol. 130, pp. 1007–1012 (2000), no month.

* cited by examiner

AEROGEL TYPE PLATINUM-TUTHENIUM-CARBON CATALYST, METHOD FOR MANUFACTURING THE SAME AND DIRECT METHANOL FUEL CELL COMPRISING THE SAME

BACKGROUND OF THE INVENTION

1. Field of the Invention

The present invention relates to an aerogel type platinum-ruthenium-carbon catalyst and a method for manufacturing the same. More particularly, the invention relates to an aerogel type platinum-ruthenium-carbon catalyst, maintaining a long-term high catalytic activity, manufactured by a sol-gel process and supercritical drying process, and a method for manufacturing the same. The invention also relates to a direct methanol fuel cell employing the aerogel type platinum-ruthenium-carbon catalyst as an anode catalyst.

2. Description of the Related Art

Fuel cells are devices for producing electricity by converting chemical energy of fuels into electrical energy via electrochemical reactions. Such fuel cells may be divided into high temperature types, medium temperature types and low temperature types, according to operating temperatures. Particularly, low temperature fuel cells such as Polymer Electrolyte Fuel Cells (PEFCs) use platinum or platinum alloy catalysts, to ensure that electrode catalysts have sufficient catalytic activity even at low temperatures.

Fuel cells commonly utilize hydrogen as a fuel. Typical electrochemical reactions that take place in a fuel cell are represented in the following Equation 1.

Anode: $H_2 \rightarrow 2H^+ + 2e^-$

Cathode: $1/2O_2 + 2H^+ + 2e^- \rightarrow H_2O$

Full cell reaction: $H_2 + 1/2O_2 \rightarrow H_2O$ [Equation 1]

Once reactants are fed continuously, the difference in potential energy between the anode and the cathode makes an electromotive force to produce current. Pure hydrogen as a fuel, however, has several disadvantages. Cells using hydrogen require a high manufacturing cost. In addition, it is difficult to store and transport hydrogen, the fuel. Therefore, attempts to use other substances as a fuel for cells have been made. One example of them is a Direct Methanol Fuel Cell (DMFC) using methanol. When using methanol as a fuel, cells have advantages of smaller size, easier fuel supply, and reduced problems of recycling and waste disposal.

DMFCs have the same constituents as those used in PEFCs which use hydrogen as a fuel. DMFCs also use mainly platinum or platinum alloy catalysts as anode catalysts. In such cells, protons and electrons are generated by a chemical reaction as in Equation 2 below.

$H_2O + CH_3OH \rightarrow CO_2 + 6H^+ + 6e^-$ [Equation 2]

The protons generated at this time migrate to the cathode via the electrolyte between the anode and the cathode. The protons react with $O_2$ on the platinum catalyst, as in Equation 3 below.

$3/2O_2 + 6H^+ + 6e^- \rightarrow 3H_2O$ [Equation 3]

The full cell reaction occurring at this time is as in Equation 4.

$CH_3OH + 3/2O_2 \rightarrow CO_2 + 2H_2O$ [Equation 4]

However, DMFCs have problems of shorter life of the cells and lower energy density, as compared to cells using hydrogen as a fuel. DMFCs require a large amount of expensive precious metals to enhance a catalytic activity of the anode. In addition, the catalysts are degraded by poisoning due to CO generated during the electrochemical reactions.

Meanwhile, though platinum is generally known as an anode catalyst for use in DMFCs and PEFCs, platinum itself has a problem upon its use. The reason is that CO is strongly adsorbed by the surface of platinum, poisoning the catalyst, thereby dramatically deteriorating the catalytic activity. CO is present as an un-oxidized product of methanol in DMFCs, while CO being present in residual quantities among raw materials in PEFCs. Trials to solve such a problem have been made by alloying platinum with ruthenium, tin, rhenium, molybdenum, etc. (T. Freelink, W. Vischer, J. A. R. Van Vcen, Electrochim. Acta 39: 1871, 1994; U.S. Pat. No. 6,232,264). Such alloying has two advantages of minimizing CO-poisoning and reducing the amount of platinum used. Especially, platinum-ruthenium alloy catalysts are known to be the best for methanol oxidation, compared to other platinum alloys, and are now commercially available.

Platinum-ruthenium alloys are commonly manufactured using a melting process at high temperature (H. A. Gasteiger, N. Markvic, P. N. Ross Jr., E. J. Cairns, J. Phys. Chem. 97:12020, 1993). Liquid-phase reduction using a reducing agent is also available. Research on depositing a platinum-ruthenium alloy on a carbon support is ongoing (V. Radmilovic, H. A. Gasteiger, P. N. Ross Jr., J. Catal. 154:98, 1995). According to the above depositing technique, active metals are highly dispersed on a carbon support which has good electro-conductivity and a large surface area, thereby reducing the amount of platinum used per unit area, while improving cell efficiency. Although this technique is ideal, it is not yet reported that carbon-supported catalysts prepared via impregnation or colloid route (M. Watanabe, M. Uchida, S. Motoo, J. Electroanal. Chem., 229:395, 1987) show greatly improved performance, as compared to unsupported platinum-ruthenium alloy catalysts.

Meanwhile, for catalysts, inorganic aerogels with ultrahigh-porosity prepared via a sol-gel process and supercritical drying process, starting with a metal alkoxide, are known. Currently, active research on methods of synthesizing carbon aerogels is ongoing. To synthesize such a carbon aerogel, an organic gel prepared via polycondensation of organic monomers is subjected to supercritical drying, thereby making an organic aerogel, followed by carbonization (R. W. Pekala, J. Mater. Sci., 24:3221, 1989; U.S. Pat. No. 4,997,804). Further, there was a report on results of carbon aerogel synthesis, where metals are uniformly dispersed by adding a small amount of transition metals such as chrome, molybdenum, tungsten, iron, cobalt, nickel, etc. (F. J. Maldonado-Hodar, C. Moreno-Castilla, J. Rivera-Utrilla and M. A. Ferro-Garcia, Stud. Sur. Sci. Catal., 130:1007, 2000).

However, these studies failed to find optimal amounts of added solvents, or ideal conditions for supercritical drying including a temperature and pressure.

To date, platinum-ruthenium alloy catalysts exhibit the best anode catalyst performance. Despite this, such platinum-ruthenium alloy catalysts are problematic in terms of application of expensive precious metals. Accordingly, there is a need to maximize dispersion of a platinum-ruthenium alloy over a carbon support, enabling reduction of amounts of platinum or ruthenium used, thereby ensuring a great economic benefit.

SUMMARY OF THE INVENTION

Therefore, the present invention has been made in view of the above problems, and it is an object of the present invention to provide an aerogel type platinum-ruthenium-carbon catalyst, which is manufactured by a sol-gel process and supercritical drying process, having an electrode activity and durability superior to catalysts manufactured by conventional methods, and a method for manufacturing the same. It is another object of the present invention to provide a direct methanol fuel cell employing the aerogel type platinum-ruthenium-carbon catalyst as an anode catalyst.

To accomplish the above and other objects, there is provided an aerogel type platinum-ruthenium-carbon catalyst in accordance with the invention, which consists of platinum, ruthenium and carbon, in the form of aerogel having a number of pores, prepared by drying while maintaining a microporous structure.

Preferably, the catalyst contains 5 to 70% by weight of platinum and ruthenium, and the remainder is composed of carbon. An atomic ratio of platinum to ruthenium is 1/4 to 4/1.

The method for manufacturing the aerogel type platinum-ruthenium-carbon catalyst in accordance with the invention comprises the steps of: a first step of adding metal salts and a base catalyst to a solution of organic gel materials; a second step of adding a solution of basic amine to the solution prepared at the first step, and adjusting pH of the resulting solution, thereby forming a sol; a third step of aging the sol at 40 to 90° C. for 1 to 20 days after sealing, thereby forming and stabilizing a gel; a fourth step of removing a solvent from the gel via a supercritical drying process, thereby making a type of aerogel; and a fifth step of carbonizing the aerogel in an inert atmosphere, followed by hydrogen reduction.

Preferably, a solution of the organic gel materials may contain resorcinol-formaldehyde, and the solvent is water.

Preferably, a solution of the organic gel materials may contain melamine-formaldehyde, and the solvent is water.

Preferably, a solution of the organic gel materials may contain catechol-formaldehyde, and the solvent is water.

Preferably, if the solvent is water, after the third step of forming a gel, water in the gel may be displaced by methanol, prior to carrying out the supercritical drying process at the fourth step.

Preferably, a solution of the organic gel materials may contain phloroglucinol-formaldehyde, and the solvent is alcohol.

Preferably, the solution prepared at the first step may be adjusted to pH 5 to 8 by adding basic amine at the second step.

Preferably, the aerogel may be carbonized at 500 to 1200° C. in an inert atmosphere, followed by hydrogen reduction at 200 to 1000° C. at the fifth step.

The direct methanol fuel cell according to the invention employs the aerogel type platinum-ruthenium-carbon catalyst as an anode catalyst.

BRIEF DESCRIPTION OF THE DRAWINGS

The above and other objects, features and other advantages of the present invention will be more clearly understood from the following detailed description taken in conjunction with the accompanying drawing, in which.

DESCRIPTION OF THE PREFERRED EMBODIMENTS

Figure 1:
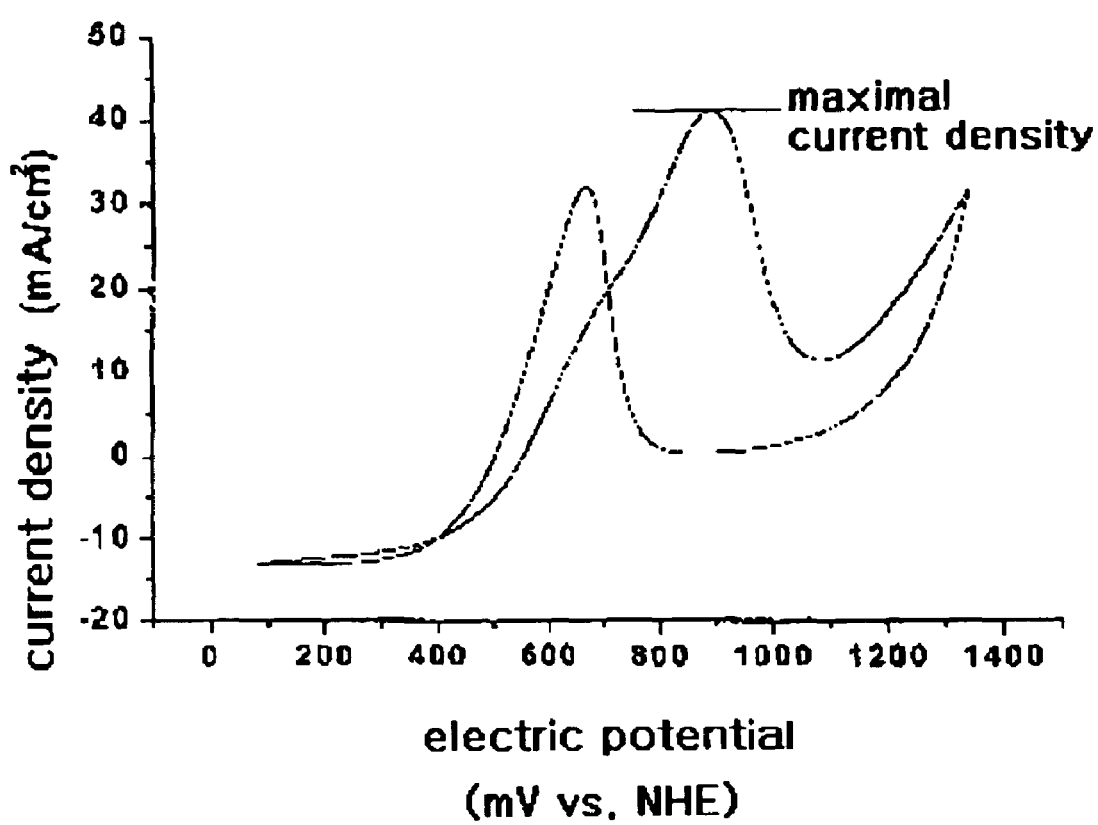
FIG. 1 is a sample graph showing a method for evaluating a catalytic activity of a catalyst of the invention, by performing cyclic voltammetry to measure a value of a maximal current density at a peak corresponding to methanol oxidation.

In manufacturing the catalyst of the invention, parameters used in the sol-gel process and supercritical drying process may be controlled so as to provide higher dispersion of a large amount of platinum-ruthenium in the carbon-supported aerogel type catalyst.

Sol-gel processing is a process for making solid oxides. A solution containing organic or inorganic metal compounds is subjected to hydrolysis and polycondensation reactions to cure a sol into a gel. With heat-treatment, the gel is converted into solid oxides. Additionally, because water and alkoxides are immiscible, a universal solvent such as alcohol, in which two materials can dissolve, is utilized. With the presence of this homogenizing agent, alcohol, hydrolysis is facilitated due to the miscibility of water and alkoxides. As polycondensation reactions continue, the individual molecules are linked and jointly aggregate in the sol. When the sol particles aggregate, or inter-knit into a network, a gel is formed. Upon drying, trapped volatiles (water, alcohol, etc) are driven off and the network shrinks as further condensation occurs.

Wet gels obtained by the sol-gel processing may be fabricated into aerogels via evaporation, solvent extraction, drying, or heat-treatment. Such a drying process is the most important step after preparation of a sol-gel solution. In the invention, the aerogel type catalyst is obtained using a supercritical drying process.

Supercritical fluids are defined as "fluids above their critical temperature and pressure conditions". They have unique properties distinguished from existing solvents. Generally, physical properties of solvents are determined according to a variety of molecules and interactions thereof. In this connection, since incompressible liquid solvents undergo little change in their intermolecular distances, single solvents with incompressibility do not undergo a dramatic change in its physical properties. On the other hand, substances being under supercritical conditions show a gradual continuous change from gas-like to liquid-like properties, in terms of density, viscosity, diffusivity, polarity, upon changes near their critical points. That is, supercritical fluids can refer to heavy fluids filling a closed space like gases. Supercritical fluid technology makes use of advantages of supercritical fluids, such as high solubility, quick transportation of substances and heat, low viscosity, high diffusivity and quick permeability into micropores due to low surface tension.

Such supercritical fluids can be used in removing residual solutions from porous solids. Since no gas-liquid interfaces are generated, severe contractions and cracks are prevented, so making it possible to dry solid materials while maintaining their forms. In the invention, the gel was formed and then subjected to a supercritical drying process, removing a solvent without changing the gel structure. That is, the micropore structure is maintained. As a result, an aerogel type catalyst, which is light and porous, is manufactured.

Carbon dioxide used as a supercritical fluid in the invention has a critical point near to room temperature ($T_c=31°$ C., $P_c=73$ atm). Because of its non-toxicity, non-flammability and cheapness, use of carbon dioxide makes it possible to develop environmentally friendly or energy saving processes. As well, carbon dioxide effectively ensures complete removal of residual solvent.

The method for manufacturing an aerogel type platinum-ruthenium-carbon catalyst of the invention, using a sol-gel process and supercritical drying process, is described in more detail.

The method for manufacturing the aerogel type carbon-supported platinum-ruthenium catalyst comprises the steps of: dissolving organic materials and metal salts; adjusting pH of the solution; forming a gel and aging; substituting alcohol for water, if the solvent is water; supercritical drying; and performing heat-treatment.

At the first step, one selected from the group consisting of resorcinol, melamine, catechol, or phloroglucinol, and formaldehyde are dissolved in a solvent. To the solution a platinum salt, a ruthenium salt and a base catalyst are added and completely dissolved. As for the metal salts, any soluble form is available, but hexachloroplatinate and ruthenium chloride are preferable. In the case of resorcinol, melamine or catechol as an organic material, it is preferable that the solvent is water, and the catalyst is sodium carbonate. In the case of phloroglucinol as an organic material, it is preferable that the solvent is alcohol such as methanol, and the catalyst is potassium hydroxide. The content of organic materials is 1 to 20 weight %, preferably 5 weight %, with respect to the solvent. A molar ratio of the catalyst to the organic material is 1/10 to 1/100, preferably 1/50. This step may be accomplished by any currently well known process for synthesizing an organic gel.

At the second step, a basic amine solution, which is diluted with a solvent, is slowly added to the solution prepared at the first step, and the pH of the resulting solution is adjusted. The basic amine is preferably ethanolamine. The resulting solution is adjusted to pH 5 to 8, preferably pH 6.5.

At the third step, the sol formed at the second step is sealed and aged, forming a gel, followed by stabilization. The aging temperature is 40 to 90° C., and the aging period is 1 to 20 days. In the case of resorcinol, melamine or catechol as an organic material, it is preferable that the aging temperature is 80° C., and the aging period is 7 days. In the case of phloroglucinol as an organic material, it is preferable that the aging temperature is 60° C., and the aging period is 5 days.

For supercritical drying, where water is used as a solvent, the solvent, water, is displaced by an organic solvent. As for the organic solvent, alcohol, acetone, etc. are available, but methanol is preferable. Such a substitution may be carried out twice per day, for 5 days or more. More substitutions are better. In the case of a phloroglucinol gel using alcohol as a solvent, this step is skipped.

At the fourth step, the aged gel is placed in a container maintaining a high temperature and pressure, and the solvent, being contained in the gel, is thoroughly removed by a common supercritical drying process, wherein carbon dioxide is continuously supplied under supercritical conditions, thereby making the gel to be a type of aerogel.

At the fifth step, the aerogel is subjected to heat-treatment at 500 to 1200° C. in an inert atmosphere, thereby carbonizing the aerogel. A temperature for carbonization is preferably 1000° C. A rate of temperature increase is 1 to 20° C. per minute, preferably 5° C. per minute. The carbon aerogel containing platinum-ruthenium thus prepared is subjected to hydrogen reduction at 200 to 1000° C., thereby manufacturing an aerogel type catalyst. An optimal temperature for reduction may be somewhat varied according to forms of aerogels. Preferably, the temperature is 600 to 700° C.

In the final resultant catalyst, an atomic ratio of platinum to ruthenium is 1/4 to 4/1, most preferably 1/1. A total content of the metal is 5 to 70% by weight relative to the catalyst.

The invention is further illustrated by the following examples which are not intended to limit the scope of the invention.

EXAMPLE 1

After dissolving 1.67 g resorcinol and 2.41 g formaldehyde in 29 g water, 0.637 g hexachloroplatinate and 0.340 g ruthenium chloride in 20 g water were added. As a catalyst, 0.033 g sodium carbonate was dissolved in 10 g water and added to the above solution. To the solution, a dilute solution of ethanol amine and water in a volume ratio of 2:3 was added, and the pH was adjusted to pH 6.5. The resulting solution was sealed and stored at 80° C. for 7 days, resulting in formation of a gel, followed by aging. The gel was solvent exchanged for methanol twice per day, for 5 days or more. The gel was then supercritically dried while applying carbon dioxide at 60° C. and at a pressure of 230 to 240 atm, thus preparing a carbon aerogel containing metals. The aerogel so prepared was carbonized at 1000° C. for 2 hrs in a helium atmosphere, followed by hydrogen reduction at 650° C. for 2 hrs, manufacturing an aerogel-type platinum-ruthenium-carbon catalyst. The catalyst thus manufactured contains 20% by weight of platinum-ruthenium. In the catalyst, platinum and ruthenium are present at a molar ratio of 1:1.

EXAMPLE 2

After dissolving 2.46 g phloroglucinol, 2.41 g formaldehyde, 0.637 g hexachloroplatinate, and 0.34 g ruthenium chloride in methanol, 0.034 g potassium hydroxide in methanol as a catalyst was added thereto. The total amount of methanol was 80 g. To the solution, a dilute solution of ethanolamine and methanol was added, and the pH was adjusted to pH 6.5. The resulting solution was sealed and stored at 60° C. for 5 days, resulting in formation of a gel, followed by aging. The gel thus prepared was subject to the same process as in Example 1, except for skipping a step of methanol exchanging, directly performing a step of supercritical drying, followed by carbonization and reduction. The catalyst thus manufactured contains 20% by weight of platinum-ruthenium. In the catalyst, platinum and ruthenium are present at a molar ratio of 1:1.

Comparative Example 1

A carbon-supported platinum-ruthenium catalyst was prepared using a general colloidal method. One gram of hexachloroplatinate was dissolved in 200 g of distilled water and added with 4 g $NaHSO_3$ to reduce the platinum. After adding 500 g distilled water to dilute the solution, 0.6M of an aqueous sodium carbonate solution and 50 g of 35% aqueous hydrogen peroxide were added. Then, 0.469 g ruthenium chloride in 50 ml water was slowly added thereto, thereby forming a platinum-ruthenium colloid. The colloid was added with 2.287 g of a carbon support (Vulcan XC-72R), and applied with hydrogen, thereby being subjected to 4 hr reduction and deposition. The resultant product was thereafter washed and dried, thereby manufacturing a carbon-supported platinum-ruthenium catalyst.

Comparative Example 2

A commercial catalyst from E-TEK was employed. The catalyst contains 20% platinum-ruthenium by weight on a carbon support.

To evaluate the catalytic activities of the catalysts prepared as in Examples and Comparative Examples, direct methanol fuel cells employing those catalysts were manufactured and the methanol was electro-oxidized as follows.

The catalysts were tested, using a conventional three electrode half-cell. First, a working electrode was prepared by applying the catalyst onto graphite. As a counter electrode, a platinum foil was adopted. Saturated calomel electrode was used as a reference electrode. The electrolyte was a solution containing 0.5 M sulfuric acid and 1 M methanol. Prior to carrying out the electrode test, oxygen was removed by producing nitrogen bubbles. Upon measurement, the temperature was maintained at 25° C. To evaluate electrode performance, cyclic voltammetry was performed. As exemplified in FIG. 1, values of the maximal current density at a peak corresponding to methanol oxidation are considered to represent catalytic performance. The scan range was −164~100 mV, and the scan rate was 25 mV/s. Durability of the catalysts was compared according to the number of scanning cycles, from 30 to 180 cycles. The results are shown Table below.

| Scanning cycles | Maximum current density (mA/cm$^2$) | | | |
|---|---|---|---|---|
| | Ex. 1 | Ex. 2 | Comp. Ex. 1 | Comp. Ex. 2 |
| 30 | 59.7 | 84.8 | 41.4 | 29.0 |
| 80 | 57.2 | 82.4 | 24.8 | 24.5 |
| 130 | 54.8 | 82.4 | 21.0 | 23.4 |
| 180 | 51.7 | 81.0 | 18.3 | 23.1 |

As shown in Table above, the catalysts prepared as in Examples 1 and 2, using a sol-gel process and supercritical drying process according to the invention, show maximal current densities of 59.7 mA/cm$^2$ and 84.8 mA/cm$^2$, respectively, upon 30 scanning cycles. These results infer that the catalysts of Examples exhibit higher electrode activities, compared to the catalysts prepared as in the Comparative Examples. In addition, the catalyst of Comparative Example 1 showed decreased activity, to less than half of the value upon 180 scanning cycles. On the other hand, the catalysts of the Examples showed only slow reduction rates, even as number of cycles increased, demonstrating superior durability of cells comprising the catalysts of the invention.

As apparent from the above description, the present invention provides an aerogel type platinum-ruthenium-carbon catalyst. To manufacture the aerogel type catalyst, after forming a gel using a sol-gel process, a solvent is removed without changing the gel structure, by a supercritical drying process, thereby making the aerogel type catalyst with a microporous structure. In addition, the catalyst thus manufactured exhibits superior catalytic activity and durability. Therefore, the aerogel type platinum-ruthenium-carbon catalyst can be widely applicable for direct methanol fuel cells and the like.

Further, carbon dioxide used in the invention as a supercritical fluid has a critical point near to room temperature, and is non-toxic, non-flammable and very cheap. For these reasons, the use of carbon dioxide makes it possible to develop environmentally friendly or energy saving processes.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An aerogel platinum-ruthenium-carbon catalyst, consisting of platinum, ruthenium and carbon, wherein said catalyst is in the form of aerogel having a number of pores, which is prepared by supercritical drying while maintaining a microporous structure, wherein the catalyst contains 5 to 70% by weight of platinum and ruthenium, and the remainder is composed of carbon, and wherein platinum and ruthenium are present in an atomic ratio of platinum to ruthenium of 1/4 to 4/1.

2. A method for manufacturing the aerogel platinum-ruthenium-carbon catalyst as set forth in claim 1, comprising the steps of:
   a first step of adding metal salts and a base catalyst to a solution of organic gel materials;
   a second step of adding a solution of basic amine to the solution prepared at the first step, and adjusting pH of the resulting solution, thereby forming a sol;
   a third step of aging the sol at 40 to 90 for 1 to 20 days after sealing, thereby forming and stabilizing a gel;
   a fourth step of removing a solvent from the gel via a supercritical drying process, thereby making an aerogel; and
   a fifth step of carbonizing the aerogel in an inert atmosphere, followed by hydrogen reduction.

3. The method as set forth in claim 2, wherein the solution of organic gel materials contains resorcinol-formaldehyde as organic gel materials, and water as a solvent.

4. The method as set forth in claim 2, wherein the solution of organic gel materials contains melamine-formaldehyde as organic gel materials, and water as a solvent.

5. The method as set forth in claim 2, wherein the solution of organic gel materials contains catechol-formaldehyde as organic gel materials, and water as a solvent.

6. The method as set forth in any one of claims 2 to 5, wherein when the solvent is water, after the third step of forming a gel, water in the gel is displaced by methanol, prior to carrying out the supercritical drying process at the fourth step.

7. The method as set forth in claim 2, wherein the solution of organic gel materials contains phloroglucinol-formaldehyde as organic gel materials, and alcohol as a solvent.

8. The method as set forth in claim 2, wherein the solution prepared at the first step is adjusted to pH 5 to 8 by adding basic amine at the second step.

9. The method as set forth in claim 2, wherein the aerogel is carbonized at 500 to 1200 in an inert atmosphere, followed by hydrogen reduction at 200 to 1000 at the fifth step.

10. A direct methanol fuel cell comprising the aerogel platinum-ruthenium-carbon catalyst as set forth in claim 1 as an anode catalyst.

11. A platinum-ruthenium-carbon catalyst comprising 5–70% by weight of platinum and ruthenium in an atomic ratio of platinum to ruthenium of 1/4 to 4/1,
   said platinum-ruthenium-carbon catalyst being in the form of a porous aerogel having a microporous structure.

12. In a direct methanol fuel cell using methanol as a fuel and comprising an anode catalyst, the improvement wherein said anode catalyst is the aerogel platinum-ruthenium-carbon catalyst of claim 11.

13. The fuel cell of claim 12 wherein, in said catalyst, said ratio of platinum to ruthenium is approximately 1:1.

14. The fuel cell of claim 12 wherein said catalyst contains approximately 20% by weight of said platinum and said ruthenium.

* * * * *